Patented Apr. 6, 1954

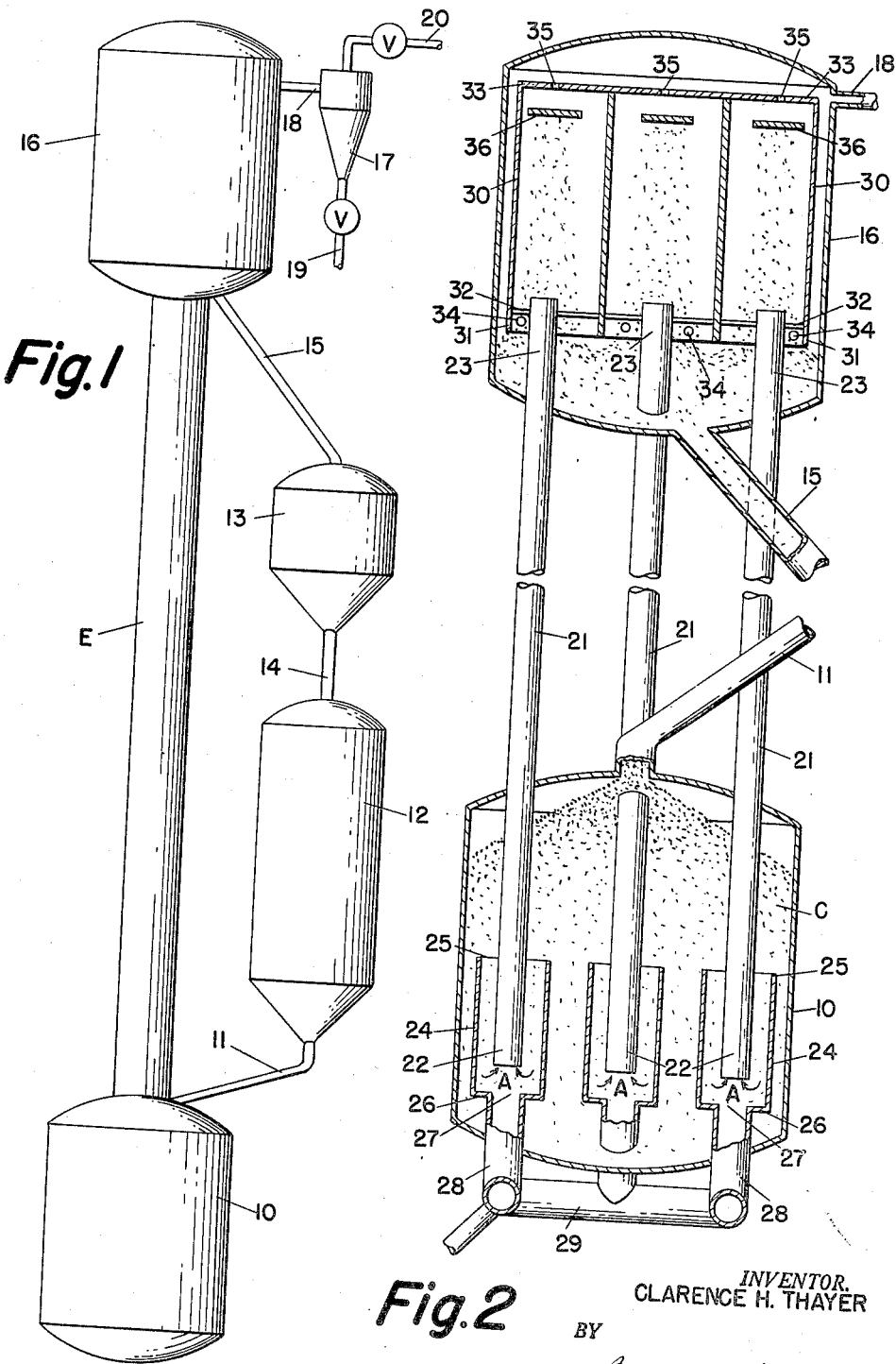

2,674,497

UNITED STATES PATENT OFFICE 2,674,497

COMBINATION ENGAGER AND DISENGAGER AIR LIFT SYSTEM

Clarence H. Thayer, Wallingford, Pa., assignor to Sun Oil Company, Philadelphia, Pa., a corporation of New Jersey Application October 23, 1950, Serial No. 191,641

1 Claim. (Cl. 302—57)

This invention relates to method and apparatus for moving pneumatically granular or pelleted contact material or catalyst from a lower vessel which receives the material in a continuous stream upwardly into an upper vessel. In particular the invention is directed to the method and apparatus for conveying the material from the lower vessel to the upper vessel in such a manner as to reduce attrition of the material particles or pellets to a minimum during passage to the upper receptacle by the lifting medium and to the method and apparatus for separating the lifting medium and material in the upper receptacle.

It is well known in the art of catalytic operations, such as the cracking of heavier petroleum fractions to gasoline and other hydrocarbon processing operations to use a catalytic or contact material in a continuous system. In such continuous systems a conversion zone is operated continuously to produce the desired product while a second zone operates continuously in regeneration. Most commercial moving catalyst systems have the conversion zone and regeneration zone in superposed relationship with the conversion zone usually above the regeneration zone so that the catalyst or contact material moves through the conversion zone to the regeneration zone by gravity and after regeneration it is conveyed upwardly and returned by gravity to the conversion zone to repeat the cycle of operation. To return the catalyst or contact material from the lower regenerating zone to the upper conversion zone two well known means applicable to the transportation of granular solids from one locus to another have been used, namely: by mechanical conveyors and by pneumatic conveyors, in the latter of which air, steam or flue gas produced at the refinery is readily available as the pneumatic lifting medium.

It is necessary in systems employing conversion and regeneration reaction zones in superposed relationship to convey the catalyst or contact material continuously upwardly to a height of several hundred feet, in order that it can be delivered continuously by gravity to the reaction zones and maintain desired volume of the contact material therein. In order to convey the material upwardly by a fluid medium a vessel positioned at a level below that of the lower reaction zone is required to receive the material by gravity from the lower reaction zone and this vessel is designed to initiate the lifting or upward conveying operation. This lower vessel is generally known in the art as an engager since the contact material therein is engaged by the lifting fluid. Conduit means is in communication with the engager vessel and is also in communication with an upper vessel positioned at a level above that of the upper reaction zone or chamber. The upper vessel is designed so that the lifting medium is separated from the catalyst or contact material and is generally known as the disengager vessel.

Specifically, the present invention is directed to the combination of both the engager portion and the disengager portion involving a continuous catalyst or contact material system, wherein a plurality of independent elevating conduits are utilized for conveying the granular or pelleted material in a manner to reduce attrition of the material to a minimum.

A more complete understanding of the present invention may be had by reference to the following description taken in connection with the accompanying drawings which form a part of the application in which:

Figure 1 is a diagrammatic view of a system for utilizing a continuously moving body of granular or pelleted contact material and Figure 2 is a view in elevation with portions sectioned to show details of the invention.

Referring to Figure 1, 10 indicates the engager which receives catalyst or contact material by gravity through line 11 from a reaction zone such as a regenerator 12 positioned below an upper reaction zone 13 which is in communication with zone 12 through line 14 and which receives contact material by gravity continuously through line 15 from a disengager 16. Means for elevating the contact material from the engager 10 to the disengager 16 is shown generally at E. Separating means such as a cyclone separator 17 is in communication with the disengager 16 through line 18 and fines are removed by the separator through line 19 while the lifting medium is removed from the separator 17 through line 20. Figure 1 does not show any details of the present invention and is provided only to show the general arrangement of a system wherein catalyst or contact material is utilized in the form of a continuously moving mass.

Referring to Figure 2 which shows details of the present invention, a plurality of conduits 21 are utilized for elevating the material from the engager 10 to the disengager 16. The number and cross-sectional area of the elevating conduits will be determined in accordance with the particular reactions the system is designed to effect. The lower ends 22 of the conduits are in communication with the engager 10 while the upper ends 23 of the conduits are in communication with the disengager 16. Means are provided for the lower ends 22 of the conduits to effectively start the lifting operation through each of the conduits independently while other means are provided for the upper ends of the conduits to effect a separation of the contact material from the lifting medium. The general purpose of both said means is to reduce attrition of the particles or pelleted material to a minimum during the elevating or lifting operation.

To this end a sleeve 24 is positioned about and in spaced relation with each of the lower ends 22 of the lift conduits and each sleeve has an upper open end 25 positioned within the body of contact material C, which is maintained within the engager 10, in a plane a substantial distance above the lower inlet ends of the lift conduits. Each of the sleeves 24 is provided with a plate 26 at its lower end and each plate is provided with an aperture 27 in which is secured the inlet end of a lifting fluid supply conduit 28 having its outer end positioned exteriorly of the engager 10. The arrangement of the sleeves 24 about the lower ends of the lift conduits provides separate contact material zones A adjacent each inlet end 22 of the lift conduits and above the contact material zones A there is also provided between the lift conduit and the sleeves annular columns of contact material of sufficient height to prevent migration of the lifting fluid from one conduit to another. Lifting fluid may be supplied independently to each fluid supply conduit 28 or, for example, the lifting fluid may be supplied through a manifold 29 to the conduits and suitable valves may be provided to control the rate of flow of the lifting fluid to the contact material zones A adjacent the inlet ends of the lift conduits. It will be understood, of course, that contact material is continuously supplied through conduit 11 from the regenerator 12 and that a predetermined level of contact material C will be maintained within the engager 10 and that the spaces between the lift conduits 21 and the sleeves will be continuously maintained full of contact material.

The outlet ends 23 of the lift conduits extend through the lower end of the upper vessel or disengager 16 and are positioned a short distance within the lower portion of the disengager. A plurality of upper compartments 30 having lower open ends 31 are disposed within the disengager 16. One compartment is provided to cooperate with each lift conduit and the upper ends 23 of the conduits will extend a short distance into the compartments. A spider 32 may be provided to maintain the conduits and compartments rigid. Each compartment is provided with an upper end 33 which is preferably spaced from the top of the disengager 16. It will be understood that the compartments 30 are of substantial height and of substantial cross-sectional area in order that the mixture of lifting fluid and contact material conveyed thereto through the conduits 21 may be decreased in velocity in the compartments and thus decrease attrition of the material to a minimum. The upper ends 33 of the compartments may be closed and the mixture of contact material and lifting fluid directed in reverse flow through the outlet ends 31 of the compartments into the lower end of the disengager 16 from which the contact material is removed through line 15 and directed to the conversion zone 13 as described in connection with Figure 1. The lifting medium then will pass downwardly in reverse flow from the compartments then upwardly between the compartments and the wall of the disengager 16 and be withdrawn through an outlet 18. As shown, however, the upper ends 33 of the compartments are apertured at 35 for the lifting fluid to pass directly from the compartments to the disengager outlet 18. A deflector plate 36 will then be provided directly below the apertures 35 in the upper end of the compartments 30 to decrease the likelihood of contact material passing through the apertures 35. It will be understood by providing apertures at the upper ends of the compartments that each compartment then becomes a disengaging zone since the lifting medium is separated therein directly from the contact material. However, when apertures are not provided in each compartment 30 the vessel 16 then becomes a general disengaging zone since the mixture of lifting fluid and contact material entering each compartment 30 reverses its path of travel and falls to the lower portion of the vessel 16 wherein the separation of the lifting fluid from the contact material is effected as heretofore described.

I claim:

Apparatus for elevating contact material from a lower vessel containing a body of the material to an upper vessel which comprises a multiplicity of elevating conduits having their lower ends extending through the top of said lower vessel to be positioned therewithin and their upper ends extending through the lower end of the upper vessel to be positioned therewithin, a sleeve about the lower end of each conduit, each sleeve having its upper end open and spaced from the conduit wall with its lower end positioned below the conduit providing independent zones for contact material, a lifting fluid conduit communicating through the lower end of each sleeve, lifting fluid supply means manifolded to said conduits to convey the contact material from said zones through the elevating conduits, a plurality of independent compartments in the upper vessel, each being in communication with the upper end of one of the elevating conduits for the reception of the contact material, said compartments being of substantial height and cross-sectional area in order that the velocity of the elevated contact material from each conduit may be decreased and minimize attrition within the compartments, means in each compartment for removing the lifting fluid and an outlet adjacent the lower end of each compartment in communication with a contact material removal chamber.

References Cited in the file of this patent

UNITED STATES PATENTS

| Number | Name | Date |
| --- | --- | --- |
| 382,991 | Westlake | Oct. 27, 1885 |
| 1,390,974 | Von Porat | Sept. 13, 1921 |
| 2,123,537 | Marr | July 12, 1938 |
| 2,493,911 | Brandt | Jan. 10, 1950 |
| 2,546,625 | Bergstrom | Mar. 27, 1951 |